US010439844B2

(12) United States Patent
Varghese

(10) Patent No.: US 10,439,844 B2
(45) Date of Patent: Oct. 8, 2019

(54) PERSISTENT WWN-FCID ASSIGNMENT SYSTEM

(71) Applicant: Dell Products L.P., Round Rock, TX (US)

(72) Inventor: Vibin Varghese, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 230 days.

(21) Appl. No.: 15/467,860

(22) Filed: Mar. 23, 2017

(65) Prior Publication Data

US 2018/0278575 A1    Sep. 27, 2018

(51) Int. Cl.
*H04L 12/66* (2006.01)
*H04L 29/12* (2006.01)

(52) U.S. Cl.
CPC .............. *H04L 12/66* (2013.01); *H04L 61/20* (2013.01); *H04L 61/6004* (2013.01); *H04L 61/6045* (2013.01)

(58) Field of Classification Search
None
See application file for complete search history.

(56) References Cited

U.S. PATENT DOCUMENTS

| 8,705,344 | B2* | 4/2014 | Hariharan | G06F 11/2007 370/217 |
| 2002/0194294 | A1* | 12/2002 | Blumenau | G06F 3/0605 709/213 |
| 2009/0092141 | A1* | 4/2009 | Banerjee | H04L 49/354 370/397 |
| 2012/0099855 | A1* | 4/2012 | Sasso | H04L 29/12254 398/25 |

* cited by examiner

*Primary Examiner* — Brian Whipple
(74) *Attorney, Agent, or Firm* — Haynes and Boone, LLP

(57) ABSTRACT

A persistent World Wide Name (WWN)-Fiber Channel Identifier (FCID) assignment system includes a Fiber Channel (FC) networking device and a server device that sets a persistent WWN-FCID bit in a second fabric login that is directed to the FC networking device subsequent to a first fabric login that was directed to the FC networking device and that resulted in the assignment of an FCID to a WWN for the server device. An FC Forwarder (FCF) device receives the second fabric login from the server device. In response to determining that the persistent WWN-FCID bit is set in the second fabric login, the FCF device sends the FC networking device a second fabric discovery corresponding to the second fabric login through a port that was used to send the FC networking device a first fabric discovery corresponding to the first fabric login.

17 Claims, 9 Drawing Sheets

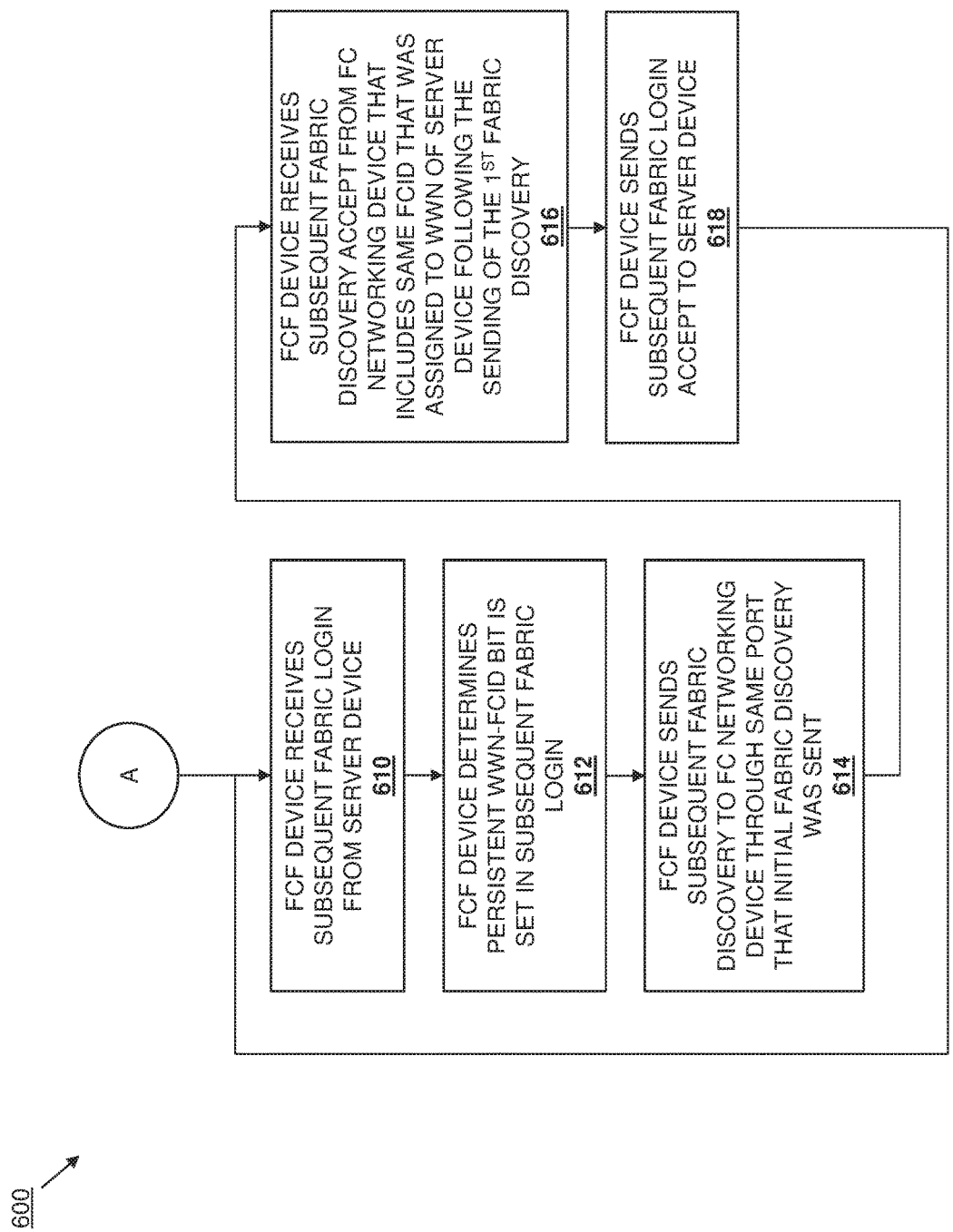

PERSISTENT WWN-FCID ASSIGNMENT SYSTEM

BACKGROUND

The present disclosure relates generally to information handling systems, and more particularly to the persistent assignment of World Wide Names (WWNs) to Fibre Channel Identifiers (FCIDs) for information handling systems utilizing an N_Port ID Virtualization (NPIV) Proxy Gateway (NPG)/Input-Output Aggregator (IOA) to communication with a Fibre Channel (FC) Storage Area Network (SAN).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems provide an FC SAN for the storage of data. In such systems, a FC switch may be utilized to couple the FC SAN to servers via a Fibre Channel Forwarder (FCF) that performs FC over Ethernet (FCoE)-to-FC protocol conversions on Ethernet communications sent from the servers to the FC SAN, as well as FC-to-FCoE protocol conversions on FC communications sent from the FC SAN to the servers. Such FCFs allow for server that communicate via the Ethernet protocol to utilize FC SANs that communicate via the FC protocol, but the conventional functionality of such FCFs raises a number of issues.

For example, servers in such systems may utilize a Converged Network Adapter (CNA) to communicate with an N_Port ID Virtualization (NPIV) Proxy Gateway (NPG)/Input-Output Aggregator (IOA) in the FCF in order to provide login communication for logging into the FC SAN, with the FCF converting those login communications and the NPG/IOA providing them to the FC switch in order to log the server into the FC SAN. However, such FCFs often include multiple and/or redundant links to the FC switch (e.g., using port based addressing), and load balancing techniques utilized by the FCF may prevent a CNA in a server from logging into the FC SAN via the same link to the FC switch in a login attempt subsequent to an initial login to the FC SAN. For example, in an initial login to an FC SAN, the CNA in a server will provide a Fabric Login (FLOGI) with a Source Identifier (SID) of "000000" to the NPG/IOA in the FCF. Upon receiving that FLOGI, the NPG/IOA in the FCF may determine which of its links to the FC switch has the lowest load, and send a Fabric Discovery (FDISC) corresponding to the FLOGI through that link to the FC switch. Upon receiving that FDISC, the FC switch assigns an FCID to the World Wide Name (WWN) that is associated with the CNA in the server, and provides an FDISC Accept (FDISC ACC) with that FCID to the NPG/IOA in the FCF. TheNPG/IOA in the FCF will then provide a corresponding FLOGI Accept (FLOGI ACC) with that FCID to the CNA in the server.

However, the CNA in the server may then be required to perform a subsequent login attempt to the FC SAN (e.g., following a link reset, a server reset, etc.) In such situations, the CNA in the server will provide a FLOGI with an SID of "000000" to the NPG/IOA in the FCF, and upon receiving that FLOGI, the NPG/IOA in the FCF may perform a load balancing technique to determine which of its links to the FC switch has the lowest load. However, if the link to the FC switch with the lowest load is a different link than was used in the initial login attempt, the NPG/IOA in the FCF will send an FDISC corresponding to the FLOGI through that link to the FC switch. Upon receiving that FDISC, the FC switch will assign a different FCID (i.e., different than the FCID that was assigned in the initial login attempt) to the WWN that is associated with the CNA in the server due to the FDISC having been received on a different link. As such, WWN-FCID assignment is not persistent in such situations.

Accordingly, it would be desirable to provide for the persistent assignment of WWNs to FCIDs.

SUMMARY

According to one embodiment, an Information Handling System (IHS) includes a plurality of ports; a processing system that is coupled to the plurality of ports; and a messaging system that is coupled to the processing system and that includes instructions that, when executed by the processing system, cause the processing system to provide an N_Port ID Virtualization (NPIV) Proxy Gateway (NPG)/Input-Output Aggregator (IOA) engine that is configured to: receive a second fabric login from a server device subsequent to receiving a first fabric login from the server device that resulted in the assignment of a Fibre Channel Identifier (FCID) to a World Wide Name (WWN) for the server device; determine that a persistent WWN-FCID bit is set in the second fabric login; and send, to an FC networking device in response to determining that the persistent WWN-FCID bit is set, a second fabric discovery corresponding to the second fabric login through a first port of the plurality of ports that was used to send the Fibre Channel (FC) networking device a first fabric discovery corresponding to the first fabric login.

BRIEF DESCRIPTION OF THE DRAWINGS

FIG. 6B is a flow chart illustrating an embodiment of a portion of a method for persistent WWN-FCID assignment.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
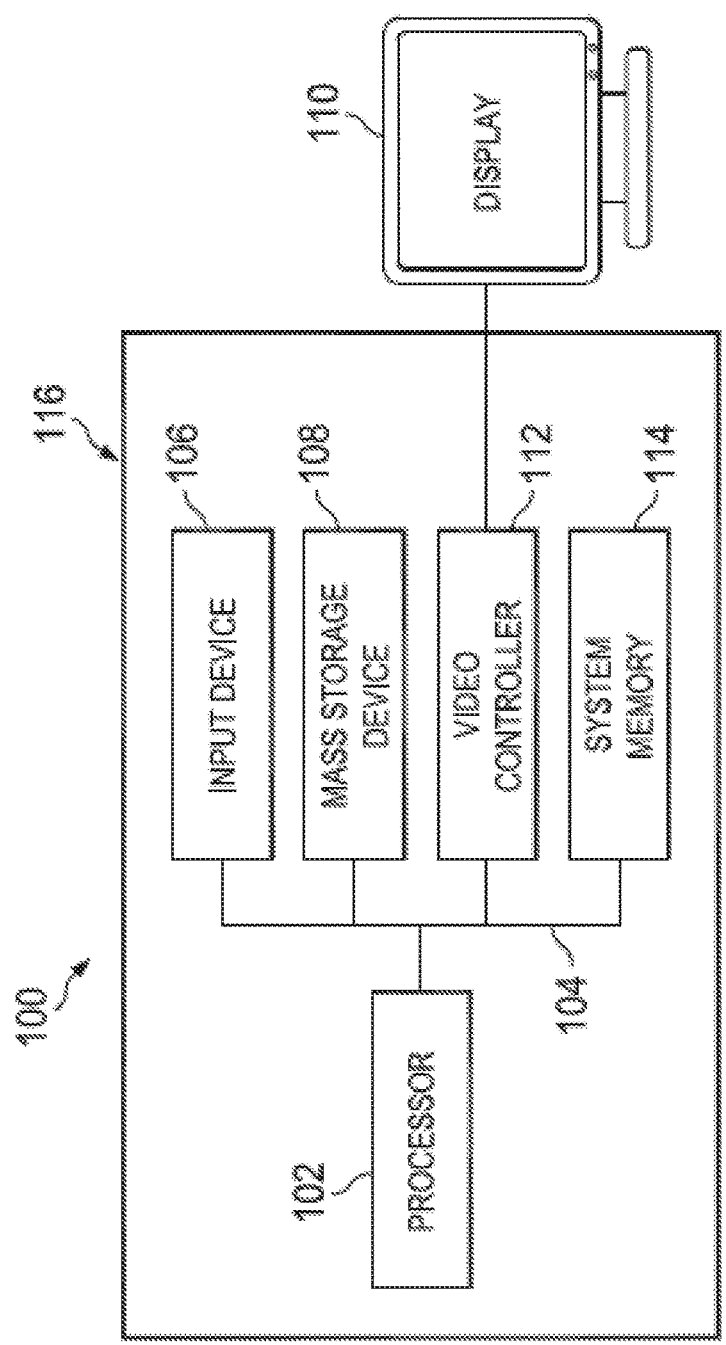
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
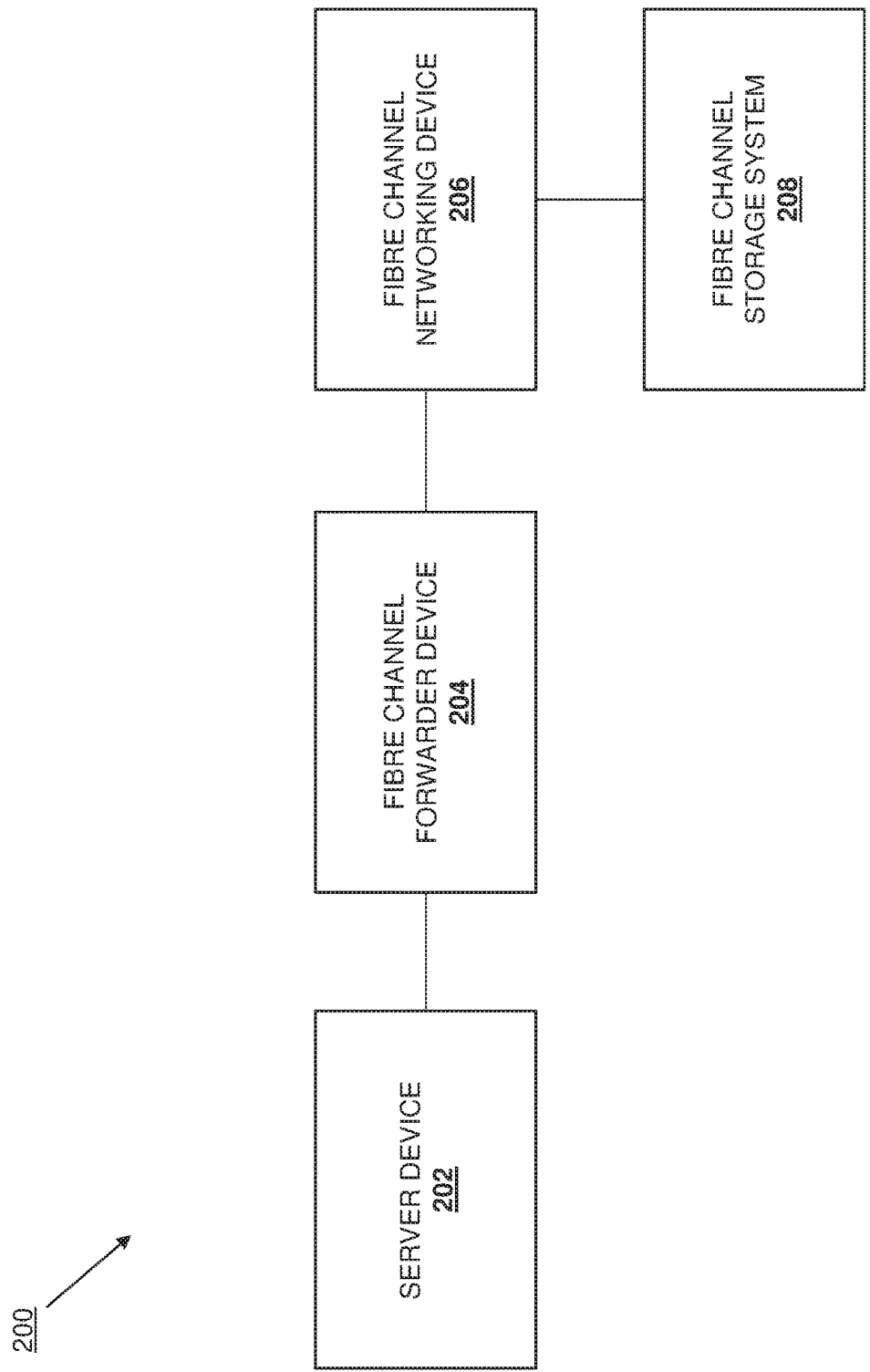
FIG. 2 is a schematic view illustrating an embodiment of a persistent WWN-FCID assignment system.

Referring now to FIG. 2, an embodiment of a persistent World Wide Name (WWN)-Fibre Channel Identifier (FCID) assignment system 200 is illustrated. In the illustrated embodiment, the persistent WWN-FCID assignment system 200 includes a server device 202 that may be the IHS 100 discussed above with reference to FIG. 1 and/or that may include some or all of the components of the IHS 100. For example, the server device 202 may be one or more of a plurality of servers in a server rack or server chassis, and one of skill in the art in possession of the present disclosure will recognize that any of a plurality of server devices may be provided in the persistent WWN-FCID assignment system 200 and may operate similarly to the server devices discussed below. In the illustrated embodiment, the server device 202 is coupled to a Fibre Channel Forwarder (FCF) device 204 that may be the IHS 100 discussed above with reference to FIG. 1 and/or that may include some or all of the components of the IHS 100. For example, the FCF device 204 may be provided by a switch or other networking device that is configured to receive Ethernet communications from the server device 202 and convert those Ethernet communications to Fibre Chanel (FC) communications for forwarding to an FC Storage Area Network (SAN), receive FC communications from the FC SAN and convert those FC communications to Ethernet communications for forwarding to the server device 202, and or perform other FCF device functionality know in the art.

In the illustrated embodiment, the FCF device 204 is coupled to an FC networking device 206 that may be the IHS 100 discussed above with reference to FIG. 1 and/or that may include some or all of the components of the IHS 100. For example, the FCF device 204 may be provided by a FC switch that is configured to receive FC communications (e.g., initialed by the server device 202) from the FCF device 204, log the server device 202 into an FC SAN, subsequently receive FC communications (e.g., initialed by the server device 202) from the FCF device 204 to allow the server device 202 to communication with the FC SAN, and perform a variety of other FC networking device functionality known in the art. In the illustrated embodiment, the FC networking device 206 is coupled to an FC storage system 208 that may be the IHS 100 discussed above with reference to FIG. 1 and/or that may include some or all of the components of the IHS 100. For example, the FC storage system 208 may be provided by a FC SAN that is configured to receive FC communications from the server device 202 through the FC networking device 206, send FC communications to the server device 202 through the FC networking device 206, and/or perform a variety of other FC storage system functionality known in the art. While a specific persistent WWN-FCID assignment system 200 is illustrated and described below, one of skill in the art in possession of the present disclosure will recognize that the teachings of the present disclosure will be beneficial for a variety of FC systems known in the art and, as such, a wide variety of modificaitons to the number, types, and orientation of devices in the persistent WWN-FCID assignment system 200 will fall within the scope of the present disclosure as well.

Figure 3:
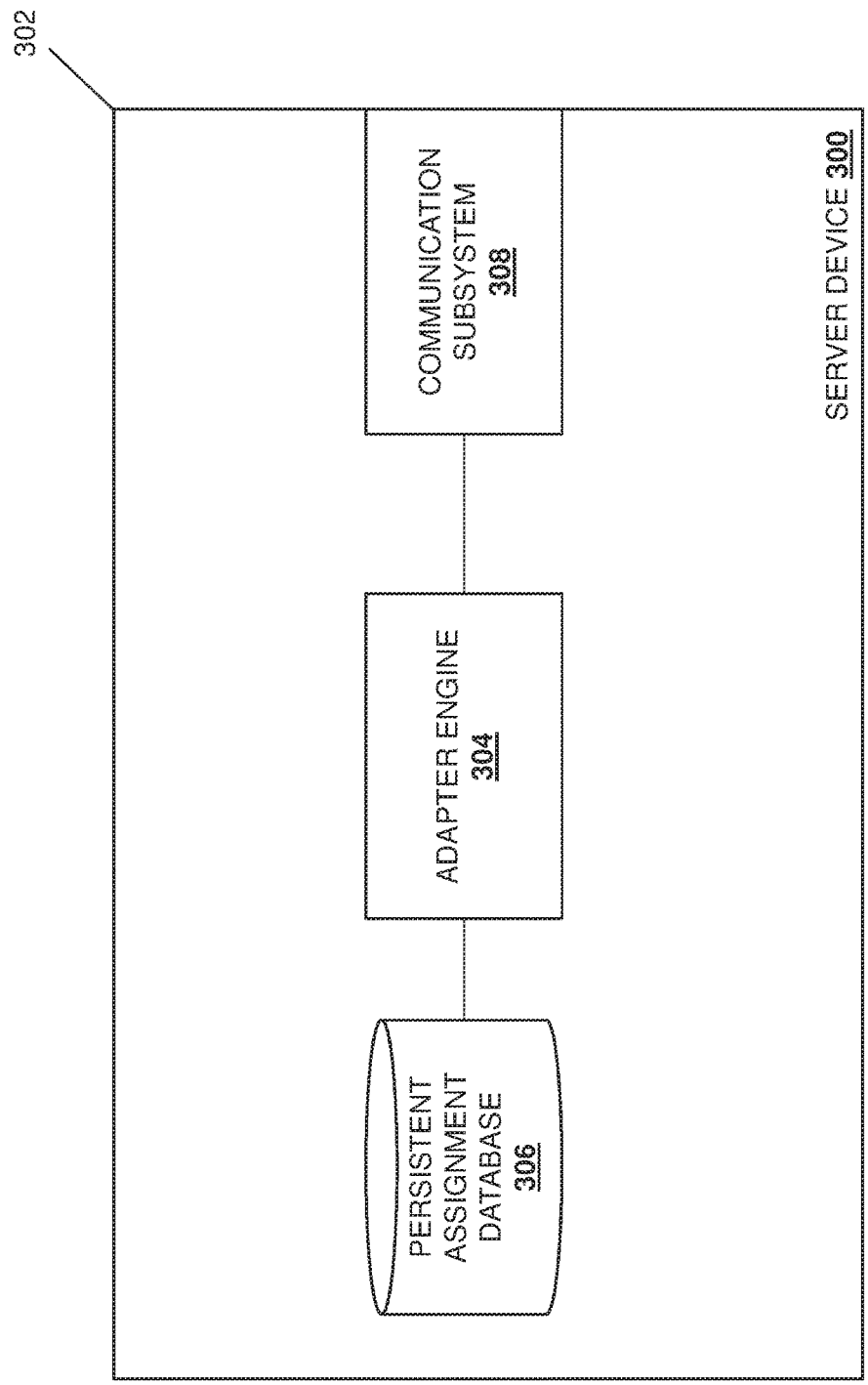
FIG. 3 is a schematic view illustrating an embodiment of a server device in the persistent WWN-FCID assignment system of FIG. 2.

Referring now to FIG. 3, an embodiment of a server device 300 is illustrated that may be the server device 202 discussed above with reference to FIG. 2. As such, the server device 300 may be the IHS 100 discussed above with reference to FIG. 1 and/or may include some or all of the components of the IHS 100, and in specific examples may be one or more of a plurality of servers in a server rack or server chassis. In the illustrated embodiment, the server device 300 includes a chassis 302 that houses the components of the server device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an adapter engine 304 that is configured to perform the functions of the adapter engines and server devices discussed below.

The chassis 302 may also house a storage system (not illustrated, but which may include the storage device 108 discussed above with reference to FIG. 1) that is coupled to the adapter engine 304 (e.g., via a coupling between the storage system and the processing system) and that may include a persistent assignment database 306 that is configured to store the data utilized as discussed below. However, in some embodiments the persistent assignment database 306 may be omitted. The chassis 302 may also house a communication subsystem 308 that is coupled to the adapter engine 304 (e.g., via a coupling between the communication subsystem 308 and the processing system) and that may include a Network Interface Controller (NIC), a wireless communication devices, ports, and/or other communication components known in the art. Furthermore, in some embodiments, components of the adapter engine 304 and/or the communication subsystem 308 may be provided by a Converged Network Adapter (CNA) that performs the functionality of the adapter engines and/or server devices discussed below. However, in other embodiments, the adapter engine 304 and/or communication subsystem 308 may be utilized to provide for other types of adapters (e.g., Host Bus Adapters (HBAs)) while remaining within the scope of the present disclosure. While a specific server device 300 has been described, one of skill in the art in possession of the present disclosure will recognize that the server device 300 may include a variety of other components that perform conventional server device functionality, as well as the functionality described below, while remaining within the scope of the present disclosure.

Figure 4:
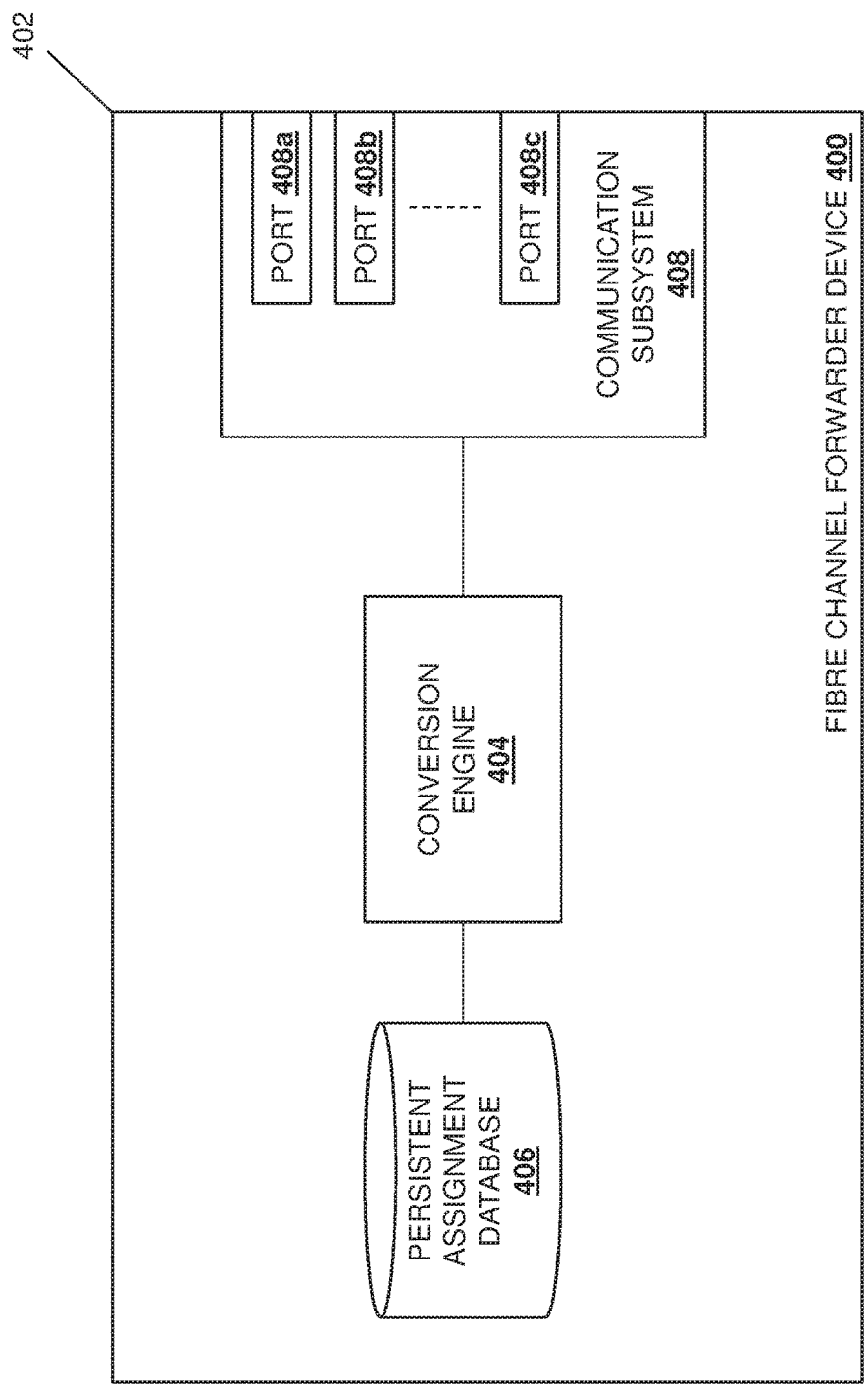
FIG. 4 is a schematic view illustrating an embodiment of an FCF device in the persistent WWN-FCID assignment system of FIG. 2.

Referring now to FIG. 4, an embodiment of a Fibre Channel Forwarder (FCF) device 400 is illustrated that may be the FCF device 204 discussed above with reference to FIG. 2. As such, the FCF device 400 may be the IHS 100 discussed above with reference to FIG. 1 and/or may include some or all of the components of the IHS 100, and in specific examples may be a switch or other networking device. In the illustrated embodiment, the FCF device 400 includes a chassis 402 that houses the components of the FCF device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a conversion engine 404 that is configured to perform the functions of the conversion engines and FCF devices discussed below. In a specific example, the conversion engine 404 may include an N_Port ID Virtualization (NPIV) Proxy Gateway (NPG)/Input-Output Aggregator (IOA) engine that operates as discussed below, although other conversion engines may fall within the scope of the present disclosure as well.

The chassis 402 may also house a storage system (not illustrated, but which may include the storage device 108 discussed above with reference to FIG. 1) that is coupled to the conversion engine 404 (e.g., via a coupling between the storage system and the processing system) and that may include a persistent assignment database 406 that is configured to store the data utilized as discussed below. However, in some embodiments the persistent assignment database 406 may be omitted. The chassis 402 may also house a communication subsystem 408 that is coupled to the conversion engine 404 (e.g., via a coupling between the communication subsystem 408 and the processing system) and that may include a Network Interface Controller (NIC), a wireless communication devices, ports, and/or other communication components known in the art. For example, in the illustrated embodiment, the communication subsystem 408 includes a plurality of ports 408a, 408b, and up to 408c, that may be coupled to an FC networking device as discussed below. Furthermore, in some embodiments, components of the conversion engine 404 and/or the communication subsystem 408 may provide an NPG/IOA that performs the functionality of the conversion engines and/or server devices discussed below. However, as discussed above, the conversion engine 404 may be utilized to provide for other types of conversions while remaining within the scope of the present disclosure. While a specific FCF device 400 has been described, one of skill in the art in possession of the present disclosure will recognize that the FCF device 400 may include a variety of other components that perform conventional FCF device functionality, as well as the functionality described below, while remaining within the scope of the present disclosure.

Figure 5:
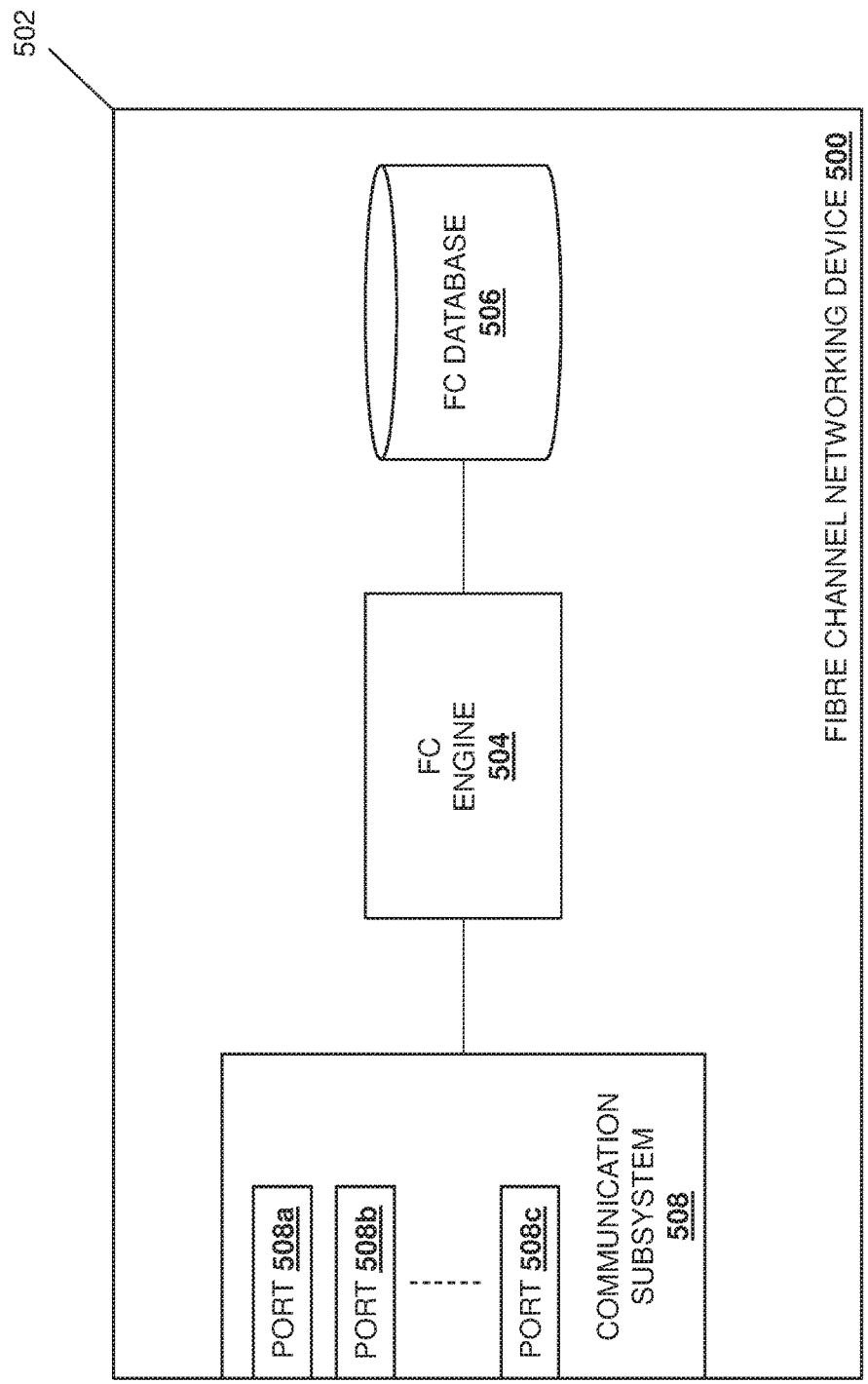
FIG. 5 is a schematic view illustrating an embodiment of an FC networking device in the persistent WWN-FCID assignment system of FIG. 2.

Referring now to FIG. 5, an embodiment of a Fibre Channel (FC) networking device 500 is illustrated that may be the FC networking device 206 discussed above with reference to FIG. 2. As such, the FC networking device 500 may be the IHS 100 discussed above with reference to FIG. 1 and/or may include some or all of the components of the IHS 100, and in specific examples may be an FC switch. In the illustrated embodiment, the FC networking device 500 includes a chassis 502 that houses the components of the FC networking device 500, only some of which are illustrated in FIG. 5. For example, the chassis 502 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a FC engine 504 that is configured to perform the functions of the FC engines and FC networking devices discussed below.

The chassis 502 may also house a storage system (not illustrated, but which may include the storage device 108 discussed above with reference to FIG. 1) that is coupled to the FC engine 504 (e.g., via a coupling between the storage system and the processing system) and that may include FC database 506 that is configured to store the data utilized as discussed below. The chassis 502 may also house a communication subsystem 508 that is coupled to the FC engine 504 (e.g., via a coupling between the communication subsystem 508 and the processing system) and that may include a Network Interface Controller (NIC), a wireless communication devices, ports, and/or other communication components known in the art. For example, in the illustrated embodiment, the communication subsystem 508 includes a plurality of ports 508a, 508b, and up to 508c, that may be coupled to an FCF device as well as an FC SAN, as discussed herein. While a specific FC networking device 500 has been described, one of skill in the art in possession of the present disclosure will recognize that the FC networking device 500 may include a variety of other components that perform conventional FCF FC networking device functionality, as well as the functionality described below, while remaining within the scope of the present disclosure.

Figure 6A:
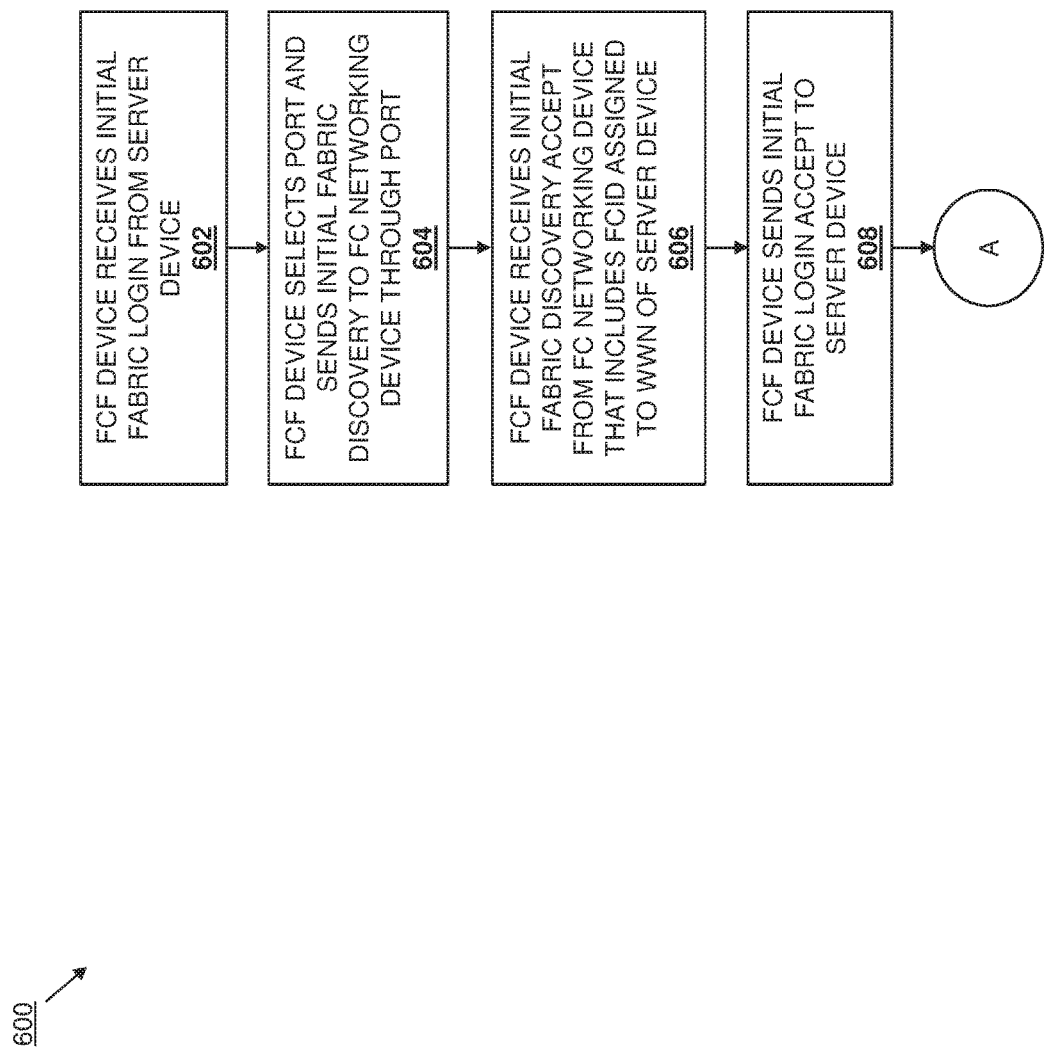
FIG. 6A is a flow chart illustrating an embodiment of a portion of a method for persistent WWN-FCID assignment.

Referring now to FIG. 6A and 6B, an embodiment of a method 600 for persistent WWN-FCID assignment is illustrated. In a variety of situations, it may be desirable to persistently assign FCIDs (sometimes also referred to as port identifiers (PIDs)) to the WWN for associated with server devices and other server systems. For example, those server devices and/or server systems may utilize the persistent assignment of FCIDs/PIDs to particular WWNs/CNAs/HBAs for each FLOGI (sent by that server device or server system) in order to support FCID/domain-port-based zoning, other Upper Level Protocol (ULP)/protocol/server requirements, and/or for a variety of other functionality known in the art. Because of the load balancing techniques utilized by FCFs as discussed above, such persistent WWN-FCID assignment cannot be guaranteed. However, the systems and methods of the present disclosure provide for persistent WWN-FCID assignments via the setting of a "persistent WWN-FCID" bit in subsequent fabric logins sent by server devices to FCF devices following the initial login to an FC SAN. Upon receiving a fabric login with the persistent WWN-FCID bit sent, the FCF device will create a subsequent fabric discovery corresponding to the subsequent fabric login and send that subsequent fabric discovery to an FC networking device through the port that was used to send an initial fabric discovery corresponding to an initial fabric login that initiated the login to the FC SAN. Thus, the setting of the persistent WWN-FCID bit in the fabric login may cause the FCF device to disregard conventional load balancing techniques that would cause the fabric discovery corresponding to a fabric login to be sent to the least-loaded port (discussed above), and instead provide that fabric login through the same port used for previous fabric logins from that server device. As such, all fabric logins (i.e., for the initial login and subsequent logins) to the FC SAN may be sent by the FCF device through the same port, which results in the FC networking device assigning the same FCID to the WWN for the server device each time it logs into the FC SAN, thus achieving persistent WWN-FCID assignments when fabric logins are sent through an FCF device.

Figure 7:
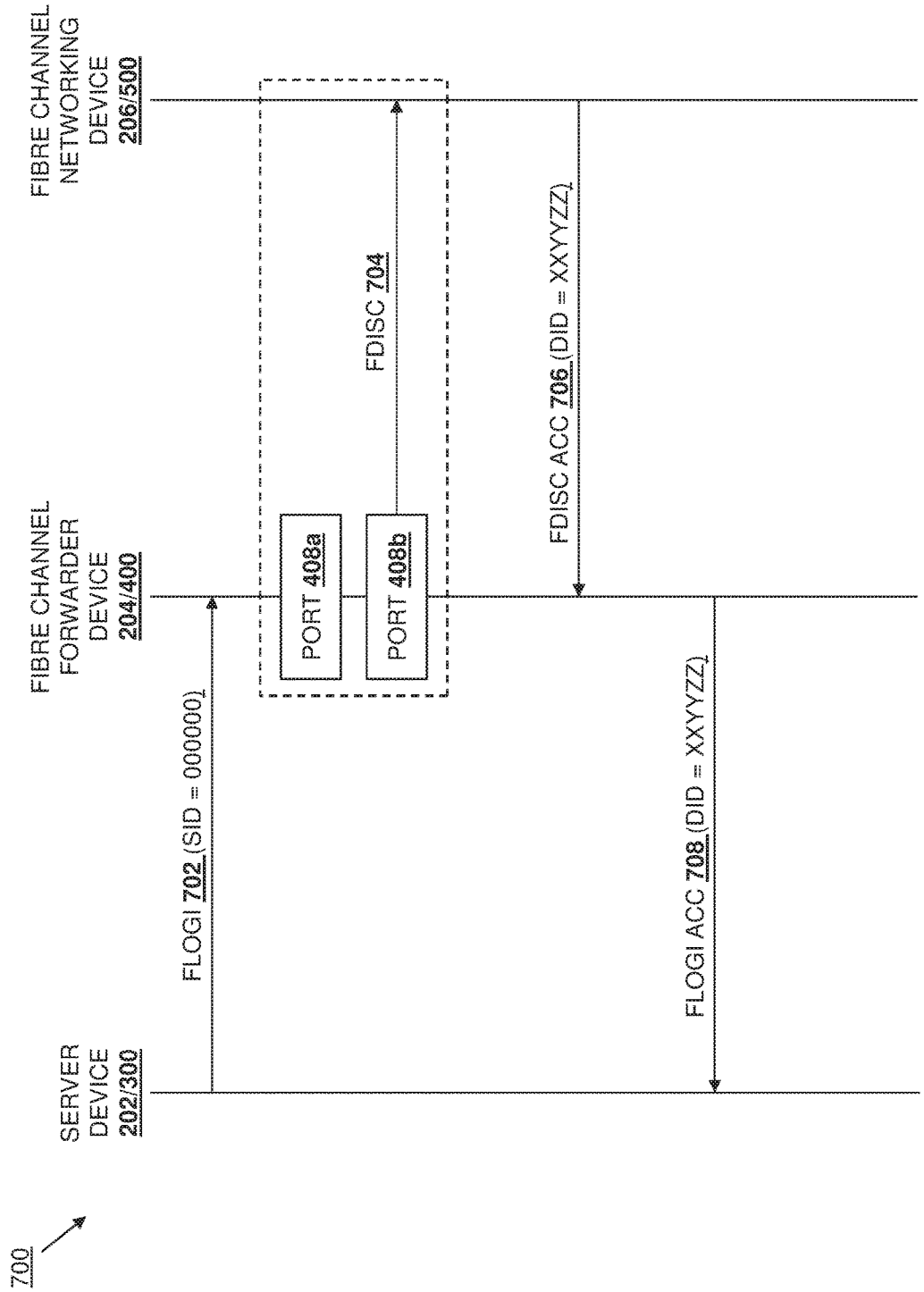
FIG. 7 is a diagram illustrating an embodiment of an initial FC SAN login during the method of FIG. 6.

Referring now to FIGS. 6A and 7, a first potion of the method 600 provides for an initial login of a server device to an FC SAN. The method 600 begins at block 602 where an FCF device receives an initial fabric login from a server device. In an embodiment, at block 602, the adapter engine 304 in the server device 202/300 may create an initial fabric login and send that initial fabric login through its communication subsystem 208 to the FCF device 204/400 such that the conversion engine 404 in the FCF device 204/400 receives that initial fabric login through its communication subsystem 408. For example, with reference to FIG. 7, a CNA in the server device 202 may create an initial FLOGI 702 with a source identifier (SID) of "000000", and send that initial FLOGI 702 to an NPG/IOA in the FCF device 204. One of skill in the art in possession of the present disclosure will recognize that the "initial" fabric login/FLOGI in the context of the present disclosure refers to a fabric login/FLOGI that results in a login to an the FC storage system 208, and that results in an assignment of an FCID to the WWN of the server device 202 that is to be kept persistent (as described below). As such, the "initial" fabric login/FLOGI may be the first fabric login sent by the server device 202 after being coupled to the FC storage system 208 via the FCF device 204 and the FC networking device 206, may be the first fabric login sent by the server device 202 that will result in a WWN-FCID assignment that is to-be kept persistent (e.g., following at least one previous fabric login that was not kept persistent), and/or may be a variety of other "initial" fabric logins/FLOGIs that would be apparent to one of skill in the art in possession of the present disclosure.

The method 600 then proceeds to block 604 where the FCF device selects a port and sends an initial fabric discovery to an FC networking device through that port. In an embodiment, at block 604, the conversion engine 404 in the FCF device 204/400 operates to create an initial fabric discovery corresponding to the initial fabric login received from the server device 202 at block 604 (e.g., the conversion engine 404 operates to convert the fabric login received from the server device 202 to a fabric discovery), select one of the ports 408a-408c in its communication subsystem 408 through which to send the FC networking device 206 the initial fabric discovery that corresponds to the initial fabric login, and send that initial fabric discovery to the FC networking device 206 through that port. For example, with reference to FIG. 7, the NPG/IOA in the FCF device 204/400 may receive the initial FLOGI 702 with the SID of "000000", create an initial FDISC 704 that corresponds to the initial FLOGI 702 (e.g., an FDISC with a SID of "000000"), perform a load balancing technique to select a link to the FC networking device 206 that is currently subject to the lowest load (e.g., the fewest number of logins), and send the initial FDISC 704 to the FC networking device 206 through the one of the ports 408a-408c that provides that link (e.g., the port 408b in FIG. 7, which in this example provides a link that currently has a lower load than port 408a (and the other ports up to 408c)). While a specific load balancing technique (i.e., selecting a link with the lowest current load) has been described, other load balancing techniques will fall within the scope of the present disclosure as well. In an embodiment, the performance of load balancing techniques to determine which of the ports 408a-408c in the communication subsystem 408 through which to send the initial FDISC may be performed in response to receiving a FLOGI with a SID of "000000", and/or in response to that FLOGI not having a persistent WWN-FCID bit set (discussed in further detail below).

The method 600 then proceeds to block 606 where the FCF device receives an initial fabric discovery accept from the FC networking device that includes an FCID assigned to a WWN of the server device. In an embodiment, at block 606, the FC engine 504 in the FC networking device 206/500 may receive the initial fabric discovery (sent by the FCF device 204) through one of the ports 508a-508c in its communication subsystem 508, assign an FCID to a WWN for the server device 202 (e.g., in a table in the FC networking device 206), create an initial fabric discovery accept that includes that FCID, and send that initial fabric discovery accept through one of the ports 508a-508c in its communication subsystem 508 to the FCF device 204/400 such that the conversion engine 404 in the FCF device 204/400 receives that initial fabric discovery accept through one of the ports 408a-408c in its communication subsystem 408. For example, with reference to FIG. 7, the FC engine 504 in the FC networking device 206/500 may receive the initial FDISC 704 (sent by the conversion engine 404 through the port 408b) through its port 508b (e.g., that provides the link to port 408b on the FCF device 204/400), assign an FCID of "XXYYZZ" to a WWN for the server device 202 (e.g., in a table in the FC database 506), create an initial FDISC ACC 706 that includes that FCID of "XXYYZZ" in the destination identifier (DID), and send that initial FDISC ACC 706 through its port 508b to the FCF device 204/400 such that the NPG/IOA in the FCF device 204/400 receives that initial FDISC ACC 706 through its port 408*b*.

The method 600 then proceeds to block 608 where the FCF device sends an initial fabric login accept to the server device. In an embodiment, at block 608, the conversion engine 404 in the FCF device 204/400 operates to create an initial fabric login accept corresponding to the initial fabric discovery accept received from the FC networking device 206 at block 606 (e.g., the conversion engine 404 operates to convert the fabric discovery accept received from the FC networking device 206 to a fabric login accept), and sends that initial fabric login accept to the server device 202. For example, with reference to FIG. 7, the NPG/IOA in the FCF device 204/400 may receive the initial FDISC ACC 706 with the DID of "XXYYZZ", create an initial FLOGI ACC 708 that corresponds to the initial FDISC ACC 706 (e.g., an FDISC ACC with a DID of "XXYYZZ"), and send the initial FLOGI ACC 708 to the sever device 202 through its communication subsystem 408 One of skill in the art in possession of the present disclosure will recognize that, following block 608, the server device 202 may be logged into the FC storage system 208/FC SAN such that the server device 202 may communicate with the FC storage system 208/FC SAN, and vice versa.

One of skill in the art in possession of the present disclosure will recognize that the discussion above of the blocks 602-608 of the method 600 provides a simplified example of an initial login of a server device to an FC SAN, and that other actions may be performed to complete that fabric login process. For example, in some embodiments, links from the FCF device 204 to the FC networking device 206 may advertise the FCF device 204 (as distinguished from other possible FCF devices that may be connected to the FC networking device 206), as well as relay FDISCs associated with FLOGIs received by the FCF device 204 based on the load balancing techniques discussed above. Furthermore, in some embodiments, the conversion engine 404 in the FCF device 204/400 may associate (e.g., in the persistent assignment database 206) any of its ports 408*a*-408*c* with at least a portion of any FCID that that was received by that port in response to a successful fabric login, and subsequent FCIDs assigned to a WWN of a server device as a result of a fabric discovery may then be matched to that port based on the common portion of the FCID. For example, using the embodiment described above with reference to FIG. 7, the NPG/IOA in the FCF device 204/400 may provide a FLOGI to the FC networking device 206 through the port 408*b* and, upon a successful login, the port 408*b* may then receive back an FCID such as "XXYY00". The NPG/IOA in the FCF device 204/400 may then associate at least a portion of that FCID (e.g., e.g., the "XXYY--" from the "XXYY00" FCID received by the port 408*b* in response to the FLOGI) with the port 408*b* in the persistent assignment database 206. Subsequently, the NPG/IOA in the FCF device 204/400 may provide the FDISC 704 to the FC networking device 206 through the port 408*b* and, upon on a successful login, the port 408*b* may receive an FCID such as "XXYYZZ" that was assigned to the WWN of the server device 202, and that FCID may be matched to the port 408*b* based on the common portion of the FCID (e.g., "XXYY--". As such, if the FC networking device 206 may be configured to utilize port-based addressing to assign FCIDs with a common portion (e.g., "XXYY--") in response to FDISCs received over a particular link, the FCF device 204 is provided a means for quickly identifying ports through which to send FDISCs in order to maintain persistent WWN-FCID assignments, as discussed below.

Further still, in some embodiments, after a successful fabric login to the FC SAN, the adapter engine 304 in the server device 202/300 may save information about the FCID (e.g., "XXYYZZ") assigned to its WWN, as well as information about the FCF device 204, in the persistent assignment database 206 (e.g., an FCID/FCF device pairing may be saved.) Yet further still, in some embodiments, the NPG/IOA in the FCF device 204/400 may store information about successful fabric logins in the persistent assignment database 406 for use in maintaining persistent WWN-FCID assignments in situations where the server device 202 does not provide FLOGIs with non-zero SIDs (discussed in further detail below). For example, following a successful fabric login (e.g., upon receiving the FDISC ACC 706), the NPG/IOA in the FCF device 204/400 may store an association in the persistent assignment database 406 between the port 408*b* that was used to send the initial FDISC 704, and the server device 202 that provided the initial FLOGI 702 that resulted in the sending of that initial FDISC 704. In an embodiment, such associations between server devices that send FLOGIs, and ports that are used to send the FDISCs corresponding to those FLOGIs, may be added or updated in the persistent assignment database 406 when a FLOGI is received from a server device with the persistent WWN/FCID bit set. As such, one of skill in the art in possession of the present disclosure will recognize a variety of actions that may be performed during the blocks 602-608 of the method 600 to enable the functionality discussed below while remaining within the scope of the present disclosure.

Figure 8:
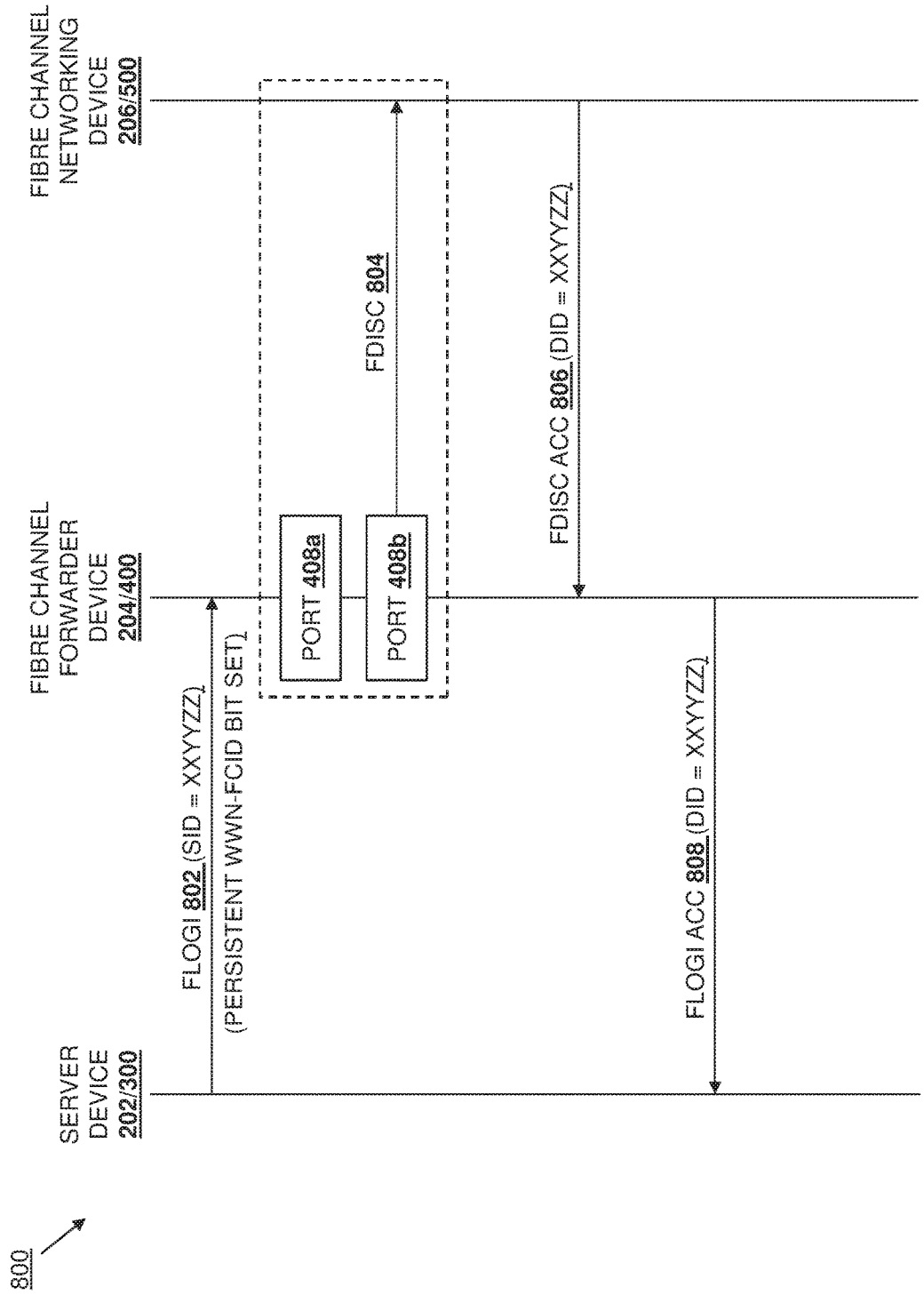
FIG. 8 is a diagram illustrating an embodiment of a subsequent FC SAN login during the method of FIG. 6.

Referring now to FIGS. 6B and 8, the method 600 then proceeds to block 610 where the FCF device receives a subsequent fabric login from the server device. The sending of the subsequent fabric login at block 610 may be performed by the server device 202 in response to a link reset, a server reset, and/or a variety of other fabric re-log-in scenarios known in the art. In an embodiment, at block 610, the adapter engine 204 in the server device 202/300 may create a subsequent fabric login and send that subsequent fabric login through its communication subsystem 208 to the FCF device 204/400 such that the conversion engine 404 in the FCF device 204/400 receives that subsequent fabric login through its communication subsystem 408. One of skill in the art in possession of the present disclosure will recognize that the "subsequent" fabric login/FLOGI in the context of the present disclosure refers to a fabric login/FLOGI that follows an initial login to an the FC storage system 208, and that may be configured such that the previous assignment of an FCID to the WWN of the server device 202 in the initial login is kept persistent (as described below). As such, the "subsequent" fabric login/FLOGI may be any fabric login subsequently sent by the server device 202 after a previous login that resulted in a WWN-FCID assignment that is being or that has been kept persistent, and/or may be a variety of other "subsequent" fabric logins/FLOGIs that would be apparent to one of skill in the art in possession of the present disclosure.

In one example of block 610, with reference to FIG. 8, the CNA in the server device 202 may create a subsequent FLOGI 802, retrieve an FCID that was previously assigned to the WWN of the server device 202 (e.g., from the persistent assignment database 306), provide that FCID (e.g., "XXYYZZ" in this example) as the SID in the subsequent FLOGI 802, set a persistent WWN-FCID bit in that subsequent FLOGI 802, and send that subsequent FLOGI 802 to an NPG/IOA in the FCF device 204/400 (e.g., that may be paired with the FCID in the persistent assignment database 306.) In a specific example, the persistent WWN-FCID bit in the subsequent FLOGI 802 may be provided by BIT 24 in word 1 of the FLOGI 802. One of skill in the art in possession of the present disclosure will recognize that BIT 24 in word 1 of conventional FLOGIs/FDISCs is used in FLOGI ACCs/FDISC ACCss to inform CNAs of whether broadcast is supported, but as discussed below, may be repurposed in the FLOGI/FDISCs discussed below to provide a request for persistent WWN-FCID assignment. As such, the setting of the persistent WWN-FCID bit in the FLOGI 802 at block 610 may include providing that bit as a "1" to indicate to the FCF device 204 that persistent WWN-FCID assignment should be enabled (e.g., as opposed to providing that bit as a "0" to indicate to the FCF device 204 that persistent WWN-FCID assignment should be disabled.) However, while a particular bit (BIT 24 in word 1 of the FLOGI) has been described as being utilized as the persistent WWN-FCID bit, one of skill in the art in possession of the present disclosure will recognize that a variety of free/unused bits in the FLOGI may be utilized to inform the to the FCF device 204 whether persistent WWN-FCID assignment should be enabled or disabled.

Furthermore, the example in FIG. 8 indicates that the subsequent FLOGI 802 includes a non-zero SID that is the FCID (e.g., "XXYYZZ" in this example) that was assigned to the WWN of the server device 202 in the initial fabric login. As such, in some embodiments, the NPG/IOA in the FCF device 204/400 may be configured to support non-zero FCIDs/SIDs in a FLOGI (e.g., some conventional NPG/IOAs may reject FLOGIs with a non-zero FCID/SID.) However, in some embodiments the subsequent FLOGI 802 may include a zero SID (e.g., "000000") rather than the FCID that was assigned to the WWN of the server device 202 in the initial fabric login. For example, in some situations it may be undesirable to utilize memory in the server device 202 to store the FCID as discussed above, while in other situations the server device 202 may not be configured to provide a non-zero FCID/SID in a FLOGI, while in yet other situations the NPG/IOA in the FCF device 204/400 may not be configured to support non-zero FCIDs/SIDs as discussed above. As such, in other embodiments of block 610, the CNA in the server device 202 may create a subsequent FLOGI 802, provide a zero SID ("000000") in the subsequent FLOGI 802, set a persistent WWN-FCID bit in that subsequent FLOGI 802, and send that subsequent FLOGI 802 to an NPG/IOA in the FCF device 204/400.

The method 600 then proceeds to block 612 where the FCF device determines that a persistent WWN-FCID bit is set in the subsequent fabric login. In an embodiment, at block 612, the conversion engine 404 in the FCF device 204/400 operates to determine that the persistent WWN-FCID bit was set in the subsequent fabric login received from the server device 202 at block 610. For example, the NPG/IOA in the FCF device 204/400 may determine that BIT 24 in word 1 of the FLOGI 802 has been provided as a "1" to indicate that persistent WWN-FCID assignment should be enabled. While not illustrated or described herein, one of skill in the art in possession of the present disclosure will recognize that if a FLOGI is received that does not have its persistent WWN-FCID bit set, the NPG/IOA in the FCF device 204/400 may operate substantially as described above with regard to block 604 to select a port via the load balancing techniques discussed above, and send an FDISC to the FC networking device 206 via that port. As such, subsequent FLOGIs without the persistent WWN-FCID bit set will have corresponding subsequent FDISCs sent via a port that may or may have not been used to send a previous FDISC associated with a previous FLOGI (i.e., because those ports are selected based only on which is currently subject to the lowest load), thus providing no guarantee of persistent WWN-FCID assignment (as if the previous and subsequent FDISCs are sent via different ports and received by the FC networking device via different links, that will result in different FCIDs being assigned to the WWN of the server device 202 in response to those respective FDISCs).

The method 600 then proceeds to block 614 where the FCF device sends a subsequent fabric discovery to the FC networking device through the same port that the initial fabric discovery was sent. At block 614, the conversion engine 404 in the FCF device 204/400 operates to create a subsequent fabric discovery corresponding to the subsequent fabric login received from the server device 202 at block 610 (e.g., the conversion engine 404 operates to convert the fabric login received from the server device 202 to a fabric discovery), select the same port 408b in its communication subsystem 408 that was used to send the FC networking device 206 the initial fabric discovery that corresponded to the initial fabric login, and send that subsequent fabric discovery to the FC networking device 206 through that port 408b. In some embodiments, the conversion engine 404 in the FCF device 204/400 may, in response to determining that the persistent WWN-FCID bit was set at block 612, use the FCID that was provided as a non-zero SID (e.g., "XXYYZZ" in this example) in the subsequent FLOGI 802 to select the port that provides the link to the FC networking device 206 through which the initial FDISC was sent at block 604.

For example, with reference to FIG. 8, the NPG/IOA in the FCF device 204/400 may receive the subsequent FLOGI 802 with the persistent WWN-FCID bit set, create a subsequent FDISC 804 that corresponds to the subsequent FLOGI 802, use the SID of "XXYYZZ" in the subsequent FLOGI 802 to determine the link to the FC networking device 206 that previously used to send the initial FDISC 704, and send the subsequent FDISC 804 to the FC networking device 206 through the port 408b that provides that link. As discussed above, the port 408b that was used to send the initial FDISC 704 at block 604 may have been associated in the persistent assignment database 406 with a portion of the FCID that was assigned to the WWN of the server device 202 in response to that initial FDISC 704. As such, as block 614, the NPG/IOA in the FCF device 204/400 may use the SID of "XXYYZZ" in the subsequent FLOGI 802 to determine that the port 408b was previously used to send the initial FDISC 704 via the link to the FC networking device 206 based on that port 408b being associated with the portion of the FCID "XXYY--". In some embodiments, the NPG/IOA in the FCF device 204/400 may provide the FCID (e.g., "XXYYZZ" in this example) as the SID in the subsequent FDISC 804 at block 614. However, in some embodiments, the NPG/IOA in the FCF device 204/400 may provide a zero SID (e.g., "000000") in the subsequent FDISC 804 in order to, for example, prevent the need for the FC networking device 206 to perform any non-conventional actions to enable the persistent WWN-FCID assignment described herein In other embodiments, the subsequent FLOGI 802 may be provided by the server device 202 with a zero SID (e.g., "000000"). As discussed above, in some embodiments the NPG/IOA in the FCF device 204/400 may store information about successful fabric logins (e.g., of the server device 202 via FLOGIs with a persistent WWN-FCID bit set) in the persistent assignment database 406 for use in maintaining persistent WWN-FCID assignments in situations where the server device 202 does not provide FLOGIs with non-zero SIDs by, for example, storing an association in the persistent assignment database 406 between the port 408*b* that was used to send the initial FDISC 704 and the server device 202 that provided the initial FLOGI 702 with the persistent WWN-FCID bit set that resulted in the sending of that initial FDISC 704. In such embodiments, the conversion engine 404 in the FCF device 204/400 may, in response to receiving a subsequent fabric login with the persistent WWN-FCID bit set and a zero SID from the server device 202, access the persistent assignment database 406 to determine that the port 408*b* was used to send the initial fabric discovery in response to the initial fabric login received from the server device 202. As such, the NPG/IOA in the FCF device 204/400 may receive the subsequent FLOGI 802 with the persistent WWN-FCID bit set and with a zero SID (e.g., "000000"), create a subsequent FDISC 804 that corresponds to the subsequent FLOGI 802, determine the link to the FC networking device 206 that previously used to send the initial FDISC 704 based on the previous association of the port 408*b* providing that link with the server device 202 that sent the initial FLOGI 702, and send the subsequent FDISC 804 to the FC networking device 206 through that port 408*b*. While a few specific examples have been provided, one of skill in the art in possession of the present disclosure will recognize that the determination of the port through which the initial FDISC was sent, and through which a subsequent FDISC will be sent, may be made in response to determining that the persistent WWN-FCID bit has been set and using a variety of techniques that will fall within the scope of the present disclosure.

The method 600 then proceeds to block 616 where the FCF device receives a subsequent fabric discovery accept from the FC networking device that includes the same FCID that was assigned to the WWN of the server device following the sending of the first fabric discovery. In an embodiment, at block 616, the FC engine 504 in the FC networking device 206/500 may receive the subsequent fabric discovery (sent by the FCF device 204) through one of the ports 508*a*-508*c* in its communication subsystem 508, assign the same FCID to the WWN for the server device 202 that was assigned at block 606, create a subsequent fabric discovery accept that includes that FCID, and send that subsequent fabric discovery accept through one of the ports 508*a*-508*c* in its communication subsystem 508 to the FCF device 204/400 such that the conversion engine 404 in the FCF device 204/400 receives that subsequent fabric discovery accept through one of the ports 408*a*-408*c* in its communication subsystem 408. For example, with reference to FIG. 8, the FC engine 504 in the FC networking device 206/500 may receive the subsequent FDISC 804 (sent by the conversion engine 404 through the port 408*b*) through its port 508*b* (e.g., that provides the link to port 408*b* on the FCF device 204/400), assign the FCID of "XXYYZZ" to the WWN for the server device 202, create a subsequent FDISC ACC 806 that includes that FCID of "XXYYZZ" in the destination identifier (DID), and send that subsequent FDISC ACC 806 to the FCF device 204/400 through its port 508*b* such that the NPG/IOA in the FCF device 204/400 receives that subsequent FDISC ACC 806 through its port 408*b*. One of skill in the art in possession of the present disclosure will recognize that conventional operation of the FC networking device 206 using port-based addressing will cause the FC networking device 206 to assign the same FCID to the WWN of the server device 202 in response to receiving the initial FDISC 704 and subsequent FDISC 804 through the same port 408*b* (using their persistence features). In other words, the functionality of the FCF device 204 described above that provides for the sending of subsequent FDISCs through the same port that was used to send an initial FDISC will result in a conventional FC networking device assigning the same FCID that was assigned to the WWN of the server device 202 in response to the initial FDISC to any subsequent FDISCs, thus achieving persistent WWN-FCID assignment.

The method 600 then proceeds to block 618 where the FCF device sends a subsequent fabric login accept to the server device. In an embodiment, at block 618, the conversion engine 404 in the FCF device 204/400 operates to create a subsequent fabric login accept corresponding to the subsequent fabric discovery accept received from the FC networking device 206 at block 616 (e.g., the conversion engine 404 operates to convert the fabric discovery accept received from the FC networking device 206 to a fabric login accept), and sends that subsequent fabric login accept to the server device 202. For example, with reference to FIG. 8, the NPG/IOA in the FCF device 204/400 may receive the subsequent FDISC ACC 806 with the DID of "XXYYZZ", create a subsequent FLOGI ACC 808 that corresponds to the subsequent FDISC ACC 806 (e.g., an FDISC ACC with a DID of "XXYYZZ"), and send the subsequent FLOGI ACC 808 to the sever device 202 through its communication subsystem 408 One of skill in the art in possession of the present disclosure will recognize that, following block 618, the server device 202 may again be logged into the FC storage system 208/FC SAN such that the server device 202 may communicate with the FC storage system 208/FC SAN, and vice versa. Furthermore, the persistence of the WWN-FCID assignment discussed above provides for the support of FCID/domain-port-based zoning, Upper Level Protocol (ULP) requirements, other protocol requirements, server requirements, and may provide a variety of other persistent WWN-FCID assignments benefits known in the art.

The method 600 may then return to block 610 and repeat blocks 610-618 for yet another subsystem fabric login from the server device. As such, one of skill in the art in possession of the present disclosure will recognize that the server device 202 may re-log into the FC storage system 208/FC SAN in response to any number of link resets, server resets, and/or other fabric re-log-in scenarios known in the art, while having the same FCID assigned to its WWN. Furthermore, other features may be provided in the persistent WWN-FCID assignment system 200 described herein in order to, for example, maintain conventional features provided by components in the persistent WWN-FCID assignment system 200. For example, conventional server devices may be configured to provide a non-zero SID in a FLOGI in order to have the FCF device provide a corresponding FDISC with a non-zero SID to the FC networking device. Upon receiving the FDISC with the non-zero SID, the conventional FC networking device will interpret that non-zero SID as an indication that the server device does not wish to update the operating environment and/or service parameters of its ports. In order to maintain this conventional functionality while using the non-zero SID in the FLOGIs and FDISCs discussed above, an update bit may be set in the FLOGI in order to indicate to the FC networking device 206 whether the server device 202 wishes to update the operating environment and/or service parameters of its ports.

For example, at block 610 the CNA in the server device 202 may create the subsequent FLOGI 802, retrieve the FCID that was previously assigned to the WWN of the server device 202, provide that FCID (e.g., "XXYYZZ" in this example) as the SID in the subsequent FLOGI 802, set the persistent WWN-FCID bit in that subsequent FLOGI 802, set an update bit in that subsequent FLOGI 802, and send that subsequent FLOGI 802 to an NPG/IOA in the FCF device 204/400. In a specific example, the update bit in the subsequent FLOGI 802 may be provided by BIT 25 in word 1 of the FLOGI 802. One of skill in the art in possession of the present disclosure will recognize that BIT 25 in word 1 of conventional FLOGIs/FDISCs is used in FLOGI ACCs/FDISC ACCs to inform CNAs of whether multicast is supported, but may be repurposed in the FLOGI/FDISCs discussed above to provide a request to update the operating environment and/or service parameters of the ports on the server device 202 when a non-zero SID is included in the FDISC. As such, the setting of the update bit in the FLOGI 802 at block 610 may include providing that bit as a "1" to cause the FCF device 204 to provide the subsequent FDISC 804 with its update bit (e.g., BIT 25 in word 1 of the FDISC 804) set to indicate to the FC networking device 206 to update the operating environment and/or service parameters of the ports on the server device 202 (e.g., as opposed to providing that bit as a "0" to cause the FCF device 204 to provide the subsequent FDISC 804 with its update bit set to "0" to indicate to the FC networking device 206 to not update the operating environment and/or service parameters of the ports on the server device 202.) However, while a particular bit (BIT 25 in word 1 of the FLOGI/FDISC) has been described as being utilized as the update bit, one of skill in the art in possession of the present disclosure will recognize that a variety of free/unused bits in the FLOGI/FDISC may be utilized to inform the FC networking device 206 whether the operating environment and/or service parameters of the ports on a server device should be updated.

Thus, systems and methods have been described that provide for persistent WWN-FCID assignment by ensuring that a subsequent fabric discovery, sent by an Fibre Channel Forwarder in response to a subsequent fabric login received from a server, is sent to a Fibre Channel switch, which uses port-based addressing, through the same port that was used to send the Fibre Channel switch a previous fabric discovery that was sent by an Fibre Channel Forwarder in response to a previous fabric login received from a server. The Fibre Channel Forwarder may identify the port used to send the previous fabric discovery in response to determining that a persistent WWN-FCID bit is set in the subsequent fabric login received from the server, and may use the FCID, which was previously assigned to the WWN of the server and that is provided as the source identifier in the subsequent fabric login, to identify that port in order to send the subsequent fabric discovery through that port. The use of the same port in sending the previous and subsequent fabric discoveries ensures that the FC switch will assign the same FCID to a WWN of the server, thus providing for persistent WWN-FCID assignments that enables FCID/domain-port-based zoning, Upper Level Protocol (ULP) requirements, other protocol requirements, server requirements, and a variety of other persistent WWN-FCID assignment benefits known in the art Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A persistent World Wide Name (WWN)-Fibre Channel identifier (FCID) assignment system, comprising:

a Fibre Channel (FC) networking device;

a server device that is configured to set a persistent WWN-FCID bit in a second fabric login that is directed to the FC networking device subsequent to a first fabric login that was directed to the FC networking device and that resulted in an assignment of an FCID to a WWN for the server device; and an FC Forwarder (FCF) device that is coupled to the FC networking device and the server device, wherein the FCF device is configured to:

receive the second fabric login from the server device;

determine that the persistent WWN-FCID bit is set in the second fabric login; and send, to the FC networking device in response to determining that the persistent WWN-FCID bit is set, a second fabric discovery corresponding to the second fabric login through a port that was used to send the FC networking device a first fabric discovery corresponding to the first fabric login.

2. The persistent WWN-FCID assignment system of claim 1, wherein the server device is configured to include the FCID that was assigned to the WWN for the server device as a source identifier in the second fabric login, and wherein the FCF device is configured to:

identify, in response to determining that the persistent WWN-FCID bit is set, the FCID that was included as the source identifier in the second fabric login; and determine, using at least a portion of the FCID, the port that was used to send the FC networking device the first fabric discovery corresponding to the second fabric login.

3. The persistent WWN-FCID assignment system of claim 1, wherein the persistent WWN-FCID bit is bit 24 in word 1 of the second fabric login.

4. The persistent WWN-FCID assignment system of claim 1, wherein the FCF device is configured to:

receive the first fabric login from the server device;

select the port for sending the FC networking device the first fabric discovery corresponding to the first fabric login;

receive a first fabric discovery accept from the FC networking device, wherein the first fabric discovery accept includes the FCID assigned to the WWN of the server device;

provide a fabric login accept that includes the FCID to the server device; and associate the server device with the port in a database.

5. The persistent WWN-FCID assignment system of claim 4, wherein the sending, in response to determining that the persistent WWN-FCID bit is set, the second fabric discovery through the port that was used to send the first fabric discovery, includes:

determining, in response to determining that the persistent WWN-FCID bit is set, that the server device is associated with the port in the database.

6. The persistent WWN-FCID assignment system of claim 1, wherein the FCF device is configured to provide the FCID that was assigned to the WWN of the server device in the second fabric discovery sent to the FC networking device, and set an update bit in the second fabric discovery sent to the FC networking device, and wherein the FC networking device is configured to:

receive the second fabric discovery from the FCF device; and determine that the second fabric discovery includes a non-zero FCID and that the update bit is set in the second fabric login and, in response, provide for an update on the server device.

7. An Information Handling System (IHS), comprising:
a plurality of ports;
a processing system that is coupled to the plurality of ports; and
a messaging system that is coupled to the processing system and that includes instructions that, when executed by the processing system, cause the processing system to provide an N_Port ID Virtualization (NPIV) Proxy Gateway (NPG)/Input-Output Aggregator (IOA) engine that is configured to:
receive a second fabric login from a server device subsequent to receiving a first fabric login from the server device that resulted in an assignment of a Fibre Channel Identifier (FCID) to a World Wide Name (WWN) for the server device;
determine that a persistent WWN-FCID bit is set in the second fabric login; and
send, to a Fibre Channel (FC) networking device in response to determining that the persistent WWN-FCID bit is set, a second fabric discovery corresponding to the second fabric login through a first port of the plurality of ports that was used to send the FC networking device a first fabric discovery corresponding to the first fabric login.

8. The IHS of claim 7, wherein the NPG/IOA engine is configured to:
identify, in response to determining that the persistent WWN-FCID bit is set, the FCID that is included as a source identifier in the second fabric login; and
determine, using at least a portion of the FCID, the first port that was used to send the FC networking device the first fabric discovery corresponding to the second fabric login.

9. The IHS of claim 7, wherein the persistent WWN-FCID bit is bit 24 in word 1 of the second fabric login.

10. The IHS of claim 7, wherein the NPG/IOA engine is configured to:
receive the first fabric login from the server device;
select the first port for sending the FC networking device the first fabric discovery corresponding to the first fabric login;
receive a first fabric discovery accept from the FC networking device, wherein the first fabric discovery accept includes the FCID assigned to the WWN of the server device;
provide a fabric login accept that includes the FCID to the server device; and
associate the server device with the first port in a database.

11. The IHS of claim 10, wherein the sending, in response to determining that the persistent WWN-FCID bit is set, the second fabric discovery through the first port that was used to send the first fabric discovery, includes:
determining, in response to determining that the persistent WWN-FCID bit is set, that the server device is associated with the first at port in the database.

12. A method for persistent World Wide Name (WWN)-Fibre Channel identifier (FCID) assignment, comprising:
receiving, by a Fibre Channel Forwarder (FCF) device from a server device, a second fabric login subsequent to receiving a first fabric login from the server device that resulted in the assignment of an FCID to a WWN for the server device;
determining, by the FCF device, that a persistent WWN-FCID bit is set in the second fabric login; and
sending, by the FCF device to a Fibre Channel (FC) networking device in response to determining that the persistent WWN-FCID bit is set, a second fabric discovery corresponding to the second fabric login through a port that was used to send the FC networking device a first fabric discovery corresponding to the first fabric login.

13. The method of claim 12, further comprising:
identifying, by the FCF device in response to determining that the persistent WWN-FCID bit is set, the FCID that is included as a source identifier in the second fabric login; and
determining, by the FCF device using at least a portion of the FCID, the port that was used to send the FC networking device the first fabric discovery corresponding to the second fabric login.

14. The method of claim 12, wherein the persistent WWN-FCID bit is bit 24 in word 1 of the second fabric login.

15. The method of claim 12, further comprising:
receiving, by the FCF device, the first fabric login from the server device, wherein the first fabric login includes the persistent WWN-FCID bit that has been set;
selecting, by the FCF device, the port for sending the FC networking device the first fabric discovery corresponding to the first fabric login;
receiving, by the FCF device, a first fabric discovery accept from the FC networking device, wherein the first fabric discovery accept includes the FCID assigned to the WWN of the server device;
providing, by the FCF device, a fabric login accept that includes the FCID to the server device; and
associating, by the FCF device, the server device with the port in a database.

16. The method of claim 15, wherein the sending, in response to determining that the persistent WWN-FCID bit is set, the second fabric discovery through the port that was used to send the first fabric discovery, includes:
determining, by the FCF device in response to determining that the persistent WWN-FCID bit is set, that the server device is associated with the port in the database.

17. The method of claim 12, further comprising:
providing, by the FCF device, the FCID that was assigned to the WWN of the server device in the second fabric discovery;
setting, by the FCF device, an update bit in the second fabric discovery sent to the FC networking device;
receiving, by the FC networking device from the FCF device, the second fabric discovery; and
determining, by the FC networking device, that the second fabric discovery includes a non-zero FCID and that the update bit is set in the second fabric login and, in response, providing for an update on the server device.

* * * * *